US010655310B2

(12) United States Patent
Lee et al.

(10) Patent No.: US 10,655,310 B2
(45) Date of Patent: May 19, 2020

(54) SHOWER BAR SYSTEM

(71) Applicant: Delta Faucet Company, Indianapolis, IN (US)

(72) Inventors: David Lee, Durham, NC (US); Alisha Nicole Buescher, Jamestown, IN (US); Qingping Wang, Xiamen (CN); ShengChao Dai, Xiamen (CN); JinTeng Liu, Longyan (CN)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 16/227,878

(22) Filed: Dec. 20, 2018

(65) Prior Publication Data

US 2019/0211537 A1 Jul. 11, 2019

Related U.S. Application Data

(60) Provisional application No. 62/613,893, filed on Jan. 5, 2018.

(51) Int. Cl.
*E03C 1/06* (2006.01)
*B05B 1/18* (2006.01)
*E03C 1/02* (2006.01)
*E03C 1/04* (2006.01)
*F16K 11/085* (2006.01)

(52) U.S. Cl.
CPC .............. *E03C 1/066* (2013.01); *B05B 1/18* (2013.01); *E03C 1/021* (2013.01); *E03C 1/025* (2013.01); *E03C 1/0408* (2013.01); *F16K 11/085* (2013.01)

(58) Field of Classification Search
CPC .......... E03C 1/066; E03C 1/021; E03C 1/025; E03C 1/0408; B05B 1/18; F16K 11/085
USPC .............................................. 4/601
See application file for complete search history.

(56) References Cited

U.S. PATENT DOCUMENTS

| 4,523,604 | A | 6/1985 | Hutto |
| 4,809,369 | A | 3/1989 | Bowden |
| 4,997,007 | A | 3/1991 | Niemann et al. |
| 5,291,622 | A | 3/1994 | Humpert |
| 5,329,650 | A | 7/1994 | Zaccai et al. |
| 5,339,469 | A | 8/1994 | Gilles |
| 6,038,715 | A | 3/2000 | Flieger et al. |
| 6,829,790 | B2 | 12/2004 | Petrovic et al. |
| 6,859,955 | B2 | 3/2005 | Hudson |
| 7,043,776 | B1 | 5/2006 | Wu |
| 7,356,857 | B2 | 4/2008 | Rosenberg |
| 7,406,984 | B2 | 8/2008 | Nikles et al. |
| 7,458,112 | B1 | 12/2008 | Yang |
| 7,857,241 | B2 | 12/2010 | Deng |
| 8,156,579 | B2 | 4/2012 | Renfrew |
| 8,191,185 | B2 | 6/2012 | Tsai |
| 8,429,769 | B2 | 4/2013 | Gross |

(Continued)

*Primary Examiner* — Huyen D Le
(74) *Attorney, Agent, or Firm* — Faegre Drinker Biddle & Reath LLP

(57) ABSTRACT

A shower bar system illustratively includes an upper mount, a lower mount, and a shower column supported external to a shower wall by the upper mount and the lower mount. A diverter valve assembly is positioned vertically proximate the upper mount, and a user interface is positioned vertically proximate the lower mount. A connecting pipe fluidly couples the diverter valve assembly to an outlet, and operably couples the user interface to the diverter valve assembly.

25 Claims, 10 Drawing Sheets

(56) References Cited

U.S. PATENT DOCUMENTS

| | | |
|---|---|---|
| 8,505,567 B1 | 8/2013 | Wu |
| 8,683,624 B1 | 4/2014 | Zhadanov et al. |
| 8,684,039 B2 | 4/2014 | Cai |
| 9,273,452 B2 | 3/2016 | Wilson |
| 9,677,256 B2 | 6/2017 | Wilson |
| 10,024,038 B2 | 7/2018 | Wilson |
| 10,245,610 B2 * | 4/2019 | Johnson ................ B05B 1/1645 |
| 10,422,113 B2 * | 9/2019 | Wilson .................... E03O 1/025 |
| 2002/0083518 A1 | 7/2002 | D'Ugo |
| 2003/0226200 A1 | 12/2003 | Charonis |
| 2005/0116062 A1 | 6/2005 | Yang |
| 2005/0127211 A1 | 6/2005 | Yeiser |
| 2006/0021131 A1 | 2/2006 | Robert et al. |
| 2006/0196972 A1 | 9/2006 | Kajuch |
| 2008/0105805 A1 | 5/2008 | Glunk |
| 2009/0265848 A1 | 10/2009 | Tsai |
| 2009/0266913 A1 | 10/2009 | Tsai |
| 2012/0151669 A1 | 6/2012 | Wilson |
| 2013/0042937 A1 * | 2/2013 | Cai .......................... E03C 1/06 |
| | | 137/861 |
| 2013/0248017 A1 | 9/2013 | Neagoe |
| 2013/0263950 A1 * | 10/2013 | Zhou .................... B05B 1/1663 |
| | | 137/625 |
| 2013/0283520 A1 | 10/2013 | Schulte |
| 2013/0283524 A1 | 10/2013 | Schulte |
| 2015/0033470 A1 * | 2/2015 | Sharratt ................ E03C 1/0408 |
| | | 4/695 |
| 2016/0177552 A1 | 6/2016 | Wilson |
| 2017/0157634 A1 | 6/2017 | Johnson |
| 2017/0233988 A1 | 8/2017 | Wilson |
| 2018/0347160 A1 | 12/2018 | Wilson |

\* cited by examiner

SHOWER BAR SYSTEM

CROSS-REFERENCE TO RELATED APPLICATION

The present application claims priority to U.S. Provisional Patent Application Ser. No. 62/613,893, filed Jan. 5, 2018, the disclosure of which is expressly incorporated herein by reference.

BACKGROUND AND SUMMARY OF THE DISCLOSURE

The present invention relates generally to plumbing fixtures and, more particularly, to a shower bar system including a shower bar supported external to a shower wall by upper and lower mounts.

Shower bar or column systems are known in the art. Such shower bar systems typically include a shower bar or column positioned external to a shower wall, and fluidly coupled to a shower pipe supported within the shower wall. Such shower bar systems may include a showerhead and a handshower, wherein a diverter valve assembly may divert water from an inlet to the showerhead, the handshower, or both.

In the illustrative shower bar system of the present disclosure, water flows from a water supply through a diverter valve with two outlets and three positions. In the first and third positions, water flows independently through the first and second outlets, respectively. In the third position, water flows through the first and second outlets simultaneously. The illustrative diverter valve is placed immediately following the water supply at the top of the shower system, between a handshower outlet and a showerhead outlet. In the first of three positions, water flows through the diverter valve and axially through the valve stem to the handshower. In the second of three positions, water flows through the diverter valve and axially through the valve stem to the handshower, as well as axially through the top of the diverter valve to the showerhead. In the third of three positions, water is communicated through the diverter valve and axially through the top of the diverter valve to the showerhead. In this illustrative embodiment, the valve stem acts as the flow path to the handshower (or another accessory) of the shower bar system. To turn the diverter valve, a handle or lever is affixed to the valve stem axially proximate the lower end of the shower bar.

According to an illustrative embodiment of the present disclosure, a shower system includes an upper mount having a supply tube with an inlet configured to fluidly couple to a shower pipe supported within a shower wall, and a shower column operably coupled to the upper mount. The shower column includes a connecting pipe in selective fluid communication with the supply tube and having a first outlet. A diverter valve assembly is fluidly coupled between the supply tube and the connecting pipe. The diverter valve assembly includes a movable valve member configured to control water flow from the inlet to the first outlet. An actuator is operably coupled to the connecting pipe, wherein rotation of the actuator rotates the connecting pipe and the movable valve member of the diverter assembly.

According to another illustrative embodiment of the present disclosure, a shower system includes an inlet, a first outlet and a second outlet. An axially extending shower column is in fluid communication with the inlet, the first outlet, and the second outlet. A diverter valve assembly includes a movable valve member configured to selectively divert water from the inlet to at least one of the first outlet and the second outlet. An actuator includes a user interface positioned below the diverter valve assembly, and an axially extending connecting member operably coupling the movable valve member and the user interface.

Accordingly to a further illustrative embodiment of the present disclosure, a shower system includes an upper mount including a supply tube having an inlet configured to fluidly couple to a shower pipe supported within a shower wall. A shower column is operably coupled to the upper mount, the shower column including a connecting pipe in selective fluid communication with the supply tube and having a first outlet. The upper mount is configured to adjust an upper end of the support column relative to an outer surface of the shower wall. A lower mount is supported by the shower wall and operably coupled to the shower column below the upper mount. A diverter valve assembly is fluidly coupled between the supply tube and the connecting pipe, the diverter valve assembly including a movable valve member configured to control water flow from the inlet to the first outlet. An actuator is operably coupled to the connecting pipe, wherein rotation of the actuator rotates the connecting pipe and the movable valve member of the diverter valve assembly. The actuator includes a user interface coupled to a lower end of the connecting pipe. The user interface includes a handle supported for rotation about a longitudinal axis of the shower column. The upper mount includes a second outlet. The movable valve member of the diverter valve assembly includes at least three positions, wherein the movable valve member in a first position diverts water from the inlet to the first outlet and seals water from the inlet to the second outlet, the movable valve member in a second position diverts water from the inlet to both the first outlet and the second outlet, and the movable valve member in a third position diverts water from the inlet to the second outlet and seals water from the inlet to the first outlet.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

A detailed description of the drawings particularly refers to the accompanying figures, in which.

DETAILED DESCRIPTION OF THE DRAWINGS

The embodiments of the invention described herein are not intended to be exhaustive or to limit the invention to the precise form disclosed. Rather, the embodiments selected for description have been chosen to enable one skilled in the art to practice the invention.

Figure 1:
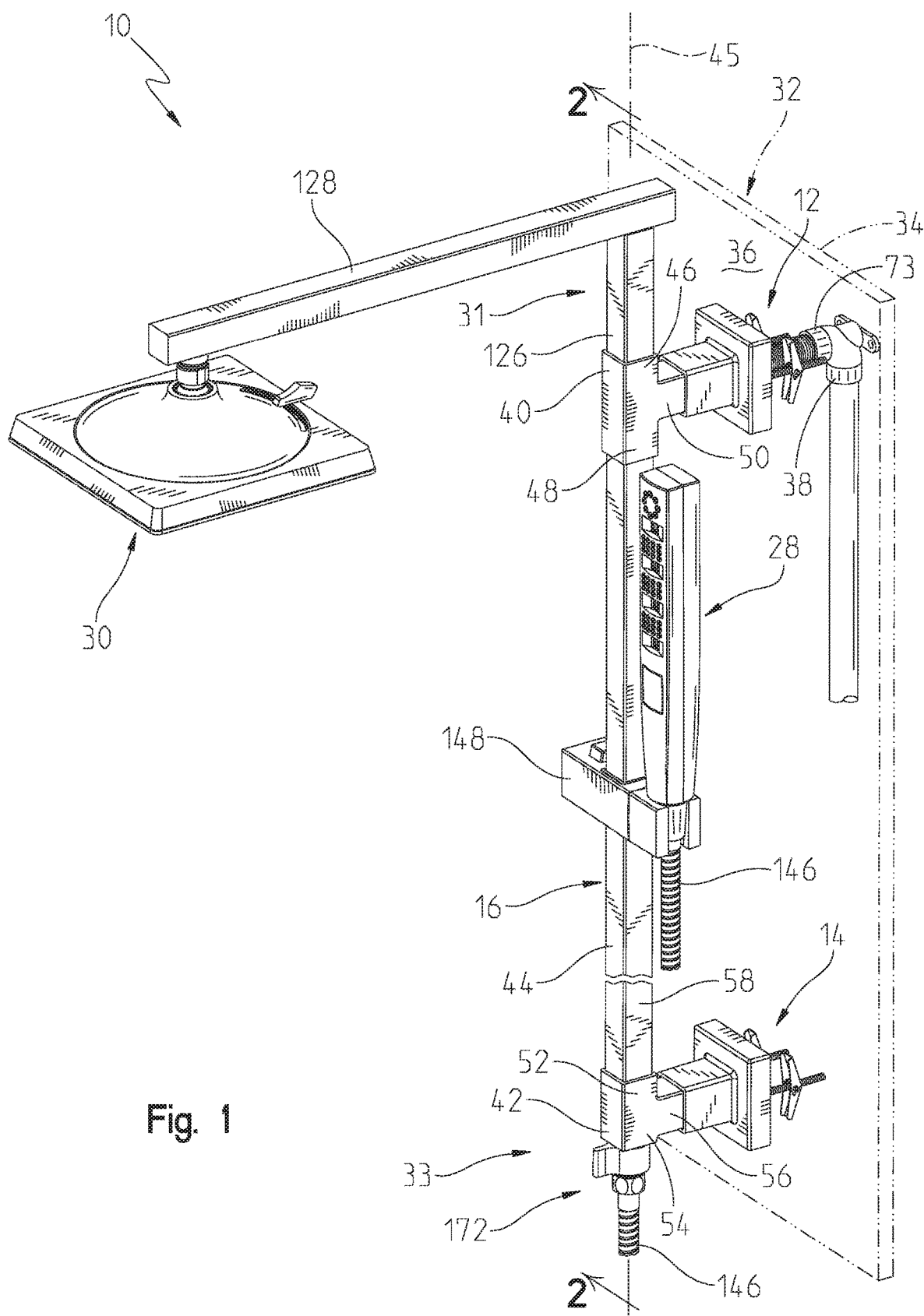
FIG. 1 is a perspective view of an illustrative shower bar system of the present disclosure supported external to a shower wall.
Figure 2:
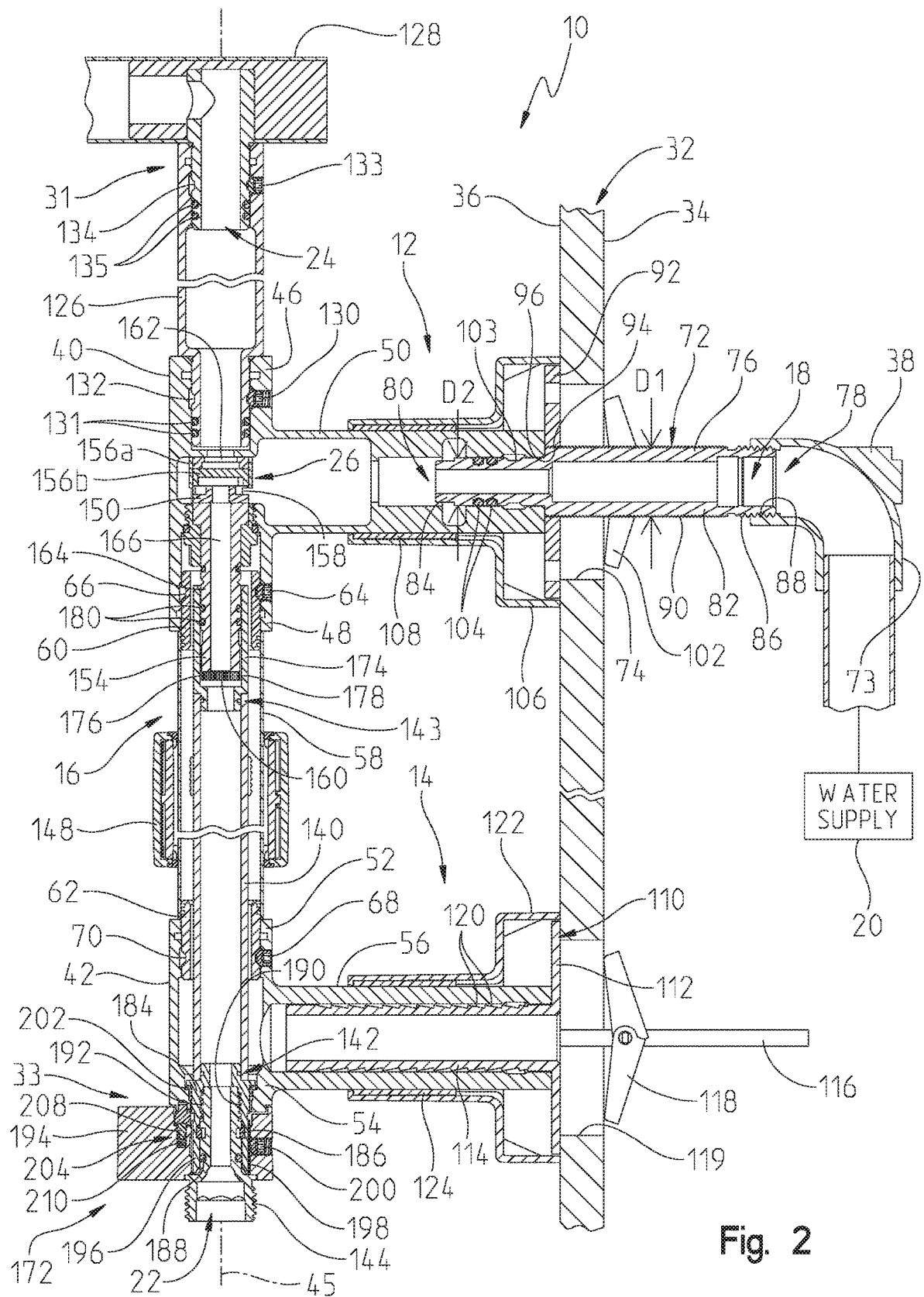
FIG. 2 is a cross-sectional view of the illustrative shower bar system, taken along line 2-2 of FIG. 1.

Referring initially to FIGS. 1 and 2, an illustrative shower bar system 10 of the present disclosure includes an upper support or mount 12, a lower support or mount 14, and an axially extending shower column or bar 16 coupled to the mounts 12 and 14. The shower bar system 10 illustratively includes an inlet 18 fluidly coupled to a water supply 20, a first outlet 22, a second outlet 24, and a diverter valve assembly 26 configured to selectively divert water from the inlet 18 to one or both of the first outlet 22 and the second outlet 24. In the illustrative embodiment, the first outlet 22 is fluidly coupled to a handshower 28, and the second outlet 24 is fluidly coupled to a showerhead 30.

Figure 3:
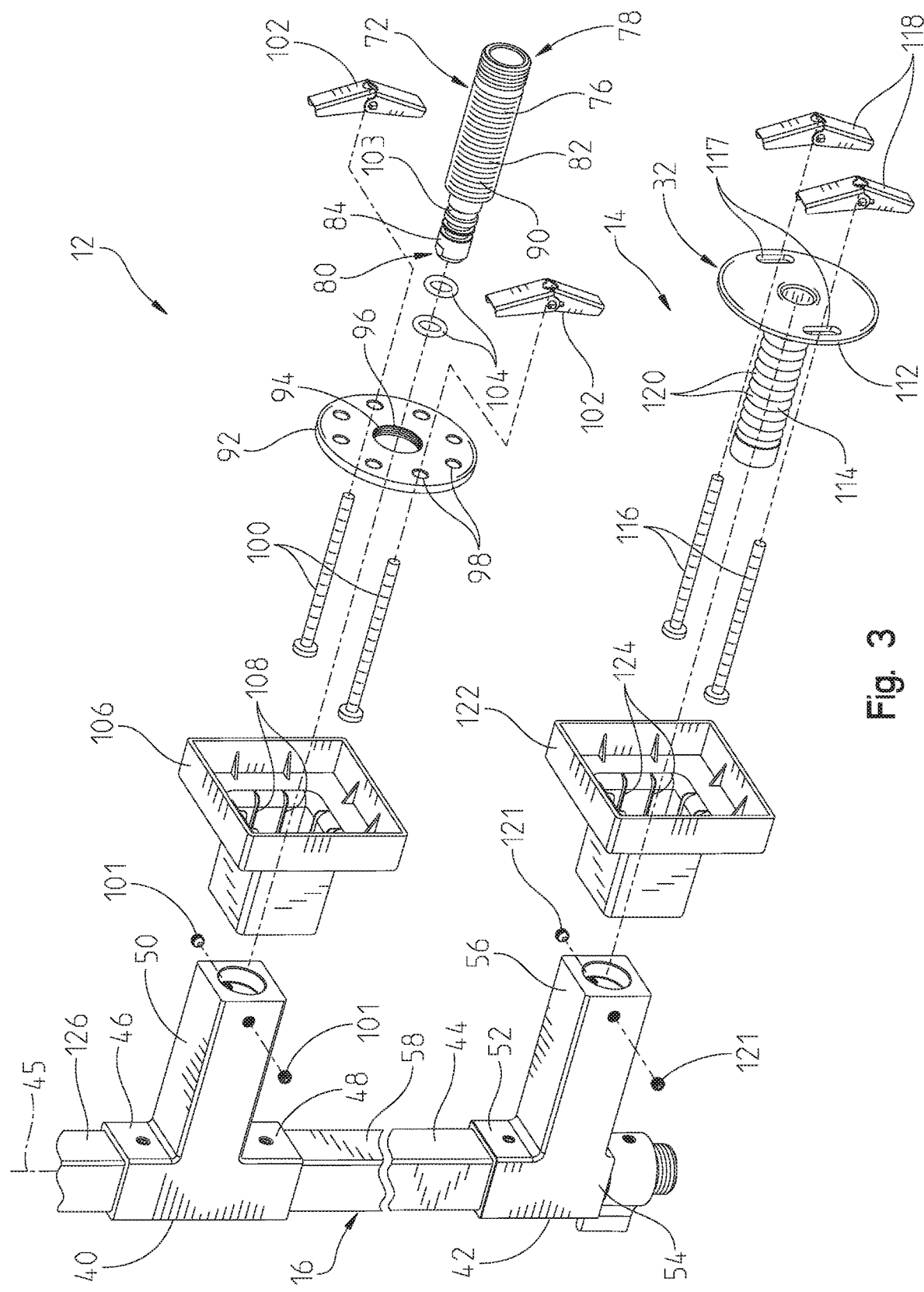
FIG. 3 is a partially exploded perspective view of the upper mount and the lower mount of the illustrative shower bar system of FIG. 1.

Referring to FIGS. 1-3, the shower column 16 is illustratively supported by the mounts 12 and 14 external to a shower wall 32 including inner (i.e., internal) and outer (i.e., external) surfaces 34 and 36. The shower column 16 extends axially between an upper end 31 and a lower end 33. A conventional shower pipe 38 is illustratively supported by the shower wall 32 behind the inner surface 36 and is fluidly coupled to the water supply 20 (FIG. 2).

Figure 4:
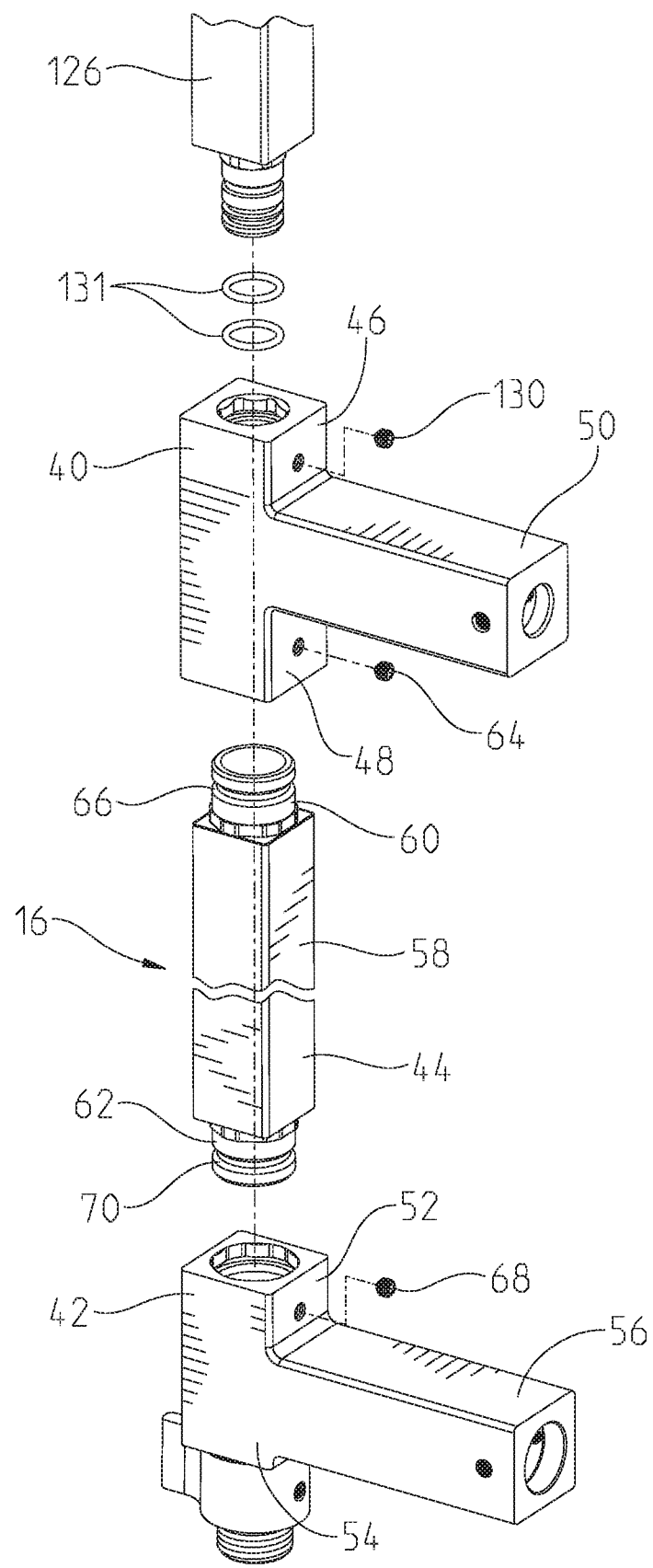
FIG. 4 is a partially exploded perspective view of the shower column of the illustrative shower bar system of FIG. 1.

With reference to FIGS. 3 and 4, the illustrative shower column 16 includes a T-shaped upper connector 40 configured to couple with the upper mount 12, and a T-shaped lower connector 42 configured to couple with the lower mount 14. An outer or connecting column member 44 extends axially along a longitudinal axis 45 between the upper connector 40 and the lower connector 42. The illustrative upper connector 40 includes opposing vertically extending upper and lower receivers or arms 46 and 48, and a horizontally extending intermediate receiver or arm 50. The illustrative lower connector 42 includes opposing upper and lower receivers or arms 52 and 54, and a horizontally extending intermediate receiver or arm 56.

With reference to FIGS. 2-5, the connecting column member 44 illustratively includes a central trim member 58 having an upper end secured (e.g., via brazing) to an upper connecting sleeve 60, and a lower end secured (e.g., via brazing) to a lower connecting sleeve 62. The upper connecting sleeve 60 is illustratively received within the lower arm 48 of the upper connector 40 such that the upper mount 12 may be axially adjusted (e.g., vertically) relative to the shower column 16. Illustratively, a set screw 64 is threadably received within the lower arm 48 of the upper connector 40 to engage within an annular groove 66 of the upper connecting sleeve 60, thereby securing the upper end of the connecting column member 44 to the upper connector 40. In another illustrative embodiment, the central trim member 58 may be threadably received within the lower arm 48 of the upper connector 40 for securing the upper end of the connecting column member 44 to the upper connector 40.

The lower connecting sleeve 62 is illustratively received within the upper arm 52 of the lower connector 42 such that the lower mount 14 may be axially adjusted (e.g., vertically) relative to the shower column 16. Illustratively, a set screw 68 is threadably received within the upper arm 52 of the lower connector 42 to engage within an annular groove 70 of the lower connecting sleeve 62, thereby securing the lower end of the connecting column member 44 to the lower connector 42. In another illustrative embodiment, the central trim member 58 may be threadably received within the upper arm 52 of the lower connector 42 for securing the lower end of the connecting column member 44 to the lower connector 42.

With reference to FIGS. 2 and 3, the upper mount 12 illustratively includes a supply tube 72 fluidly coupled to a connecting elbow 73 of the shower pipe 38 supported by the shower wall 32. The supply tube 72 is illustratively configured to extend horizontally through an upper opening 74 within the shower wall 32 between the opposing inner and outer surfaces 34 and 36. More particularly, the supply tube 72 includes a cylindrical side wall 76 extending between opposing proximal and distal ends 78 and 80. The side wall 76 includes a first or proximal portion 82, and a second or distal portion 84. Illustratively, the proximal portion 82 of the side wall 76 has a first outer diameter D1, and the distal portion 84 of the side wall 76 has a second outer diameter D2 less than the first outer diameter D1. First external threads 86 are illustratively supported by the proximal portion 82 of the side wall 76 and engage internal threads 88 of the shower pipe 38. Second external threads 90 are illustratively supported by the proximal portion 82 of the side wall 76 distally of the first external threads 86.

A mounting plate or flange 92 may be supported by the supply tube 72 for axial adjustment therebetween. In one illustrative embodiment, the mounting flange 92 is threadably coupled to the supply tube 72. As further detailed herein, in another illustrative embodiment, the flange 92' may receive set screws to couple the flange 92' to the supply tube 72'. The mounting flange 92 illustratively includes a center opening 94 with internal threads 96 that mate with the second external threads 90 on the supply tube 72. A plurality of circumferentially spaced openings 98 are configured to receive mounting bolts 100. Toggle nuts 102 mate with the bolts 100 to secure the mounting flange 92 to the shower wall 32. More particularly, the bolts 100 and toggle nuts 102 clamp the mounting flange 92 to the outer surface 36 of the shower wall 32.

The distal end 80 of the supply tube 72 is sealingly received within the intermediate arm 50 of the upper connector 40. Set screws 101 are illustratively received within an annular groove 103 of the supply tube 72 to secure the supply tube 72 to the upper connector 40. O-rings 104 may provide a seal between the supply tube 72 and the upper connector 40. As may be appreciated, rotating the supply tube 72 within the mounting flange 92 adjusts the position of the distal end 80 of the supply tube 72 relative to the outer surface 36 of the shower wall 32. In other words, the mounting flange 92 may be rotated about the proximal portion 82 of the supply tube 72 to adjust the axial position of the mounting flange 92 relative to the proximal and distal ends 78 and 80 of the supply tube 72. As such, the position of the upper connector 40 and the upper end 31 of the shower column 16 may be adjusted relative to the outer surface 36 of the shower wall 32.

A cover or escutcheon 106 is illustratively supported by the intermediate arm 50 of the upper connector 40, and engages the outer surface 36 of the shower wall 32. A plurality of ribs 108 are illustratively supported by the cover 106 to frictionally engage and secure the cover 106 to the upper connector 40.

Figure 7:
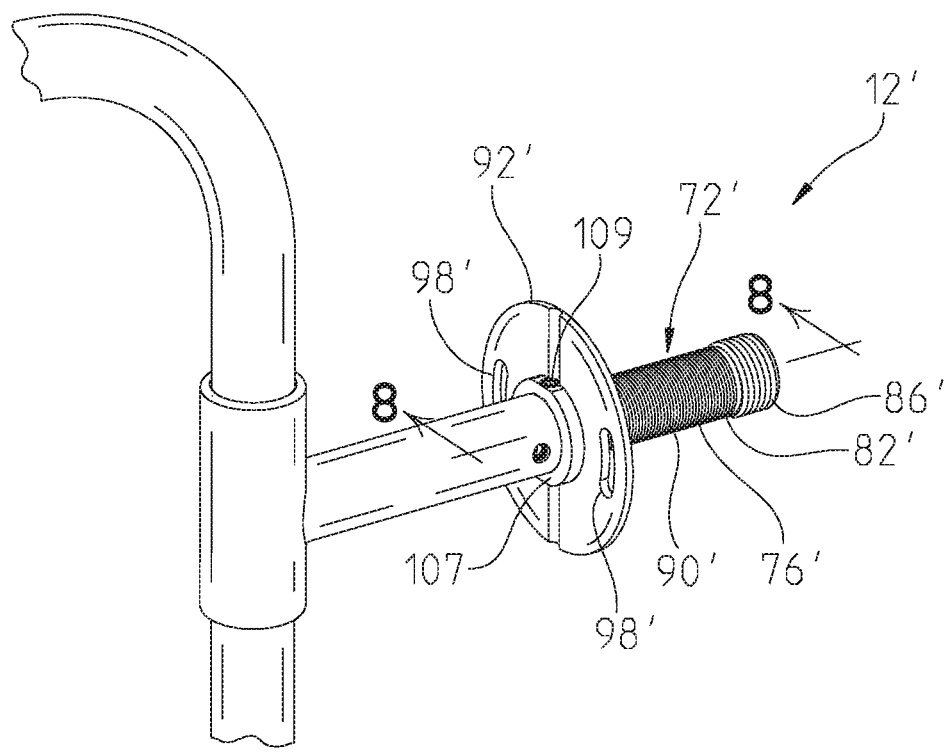
FIG. 7 is a perspective view of a further illustrative upper mount of the illustrative shower bar system of FIG. 1.
Figure 8:
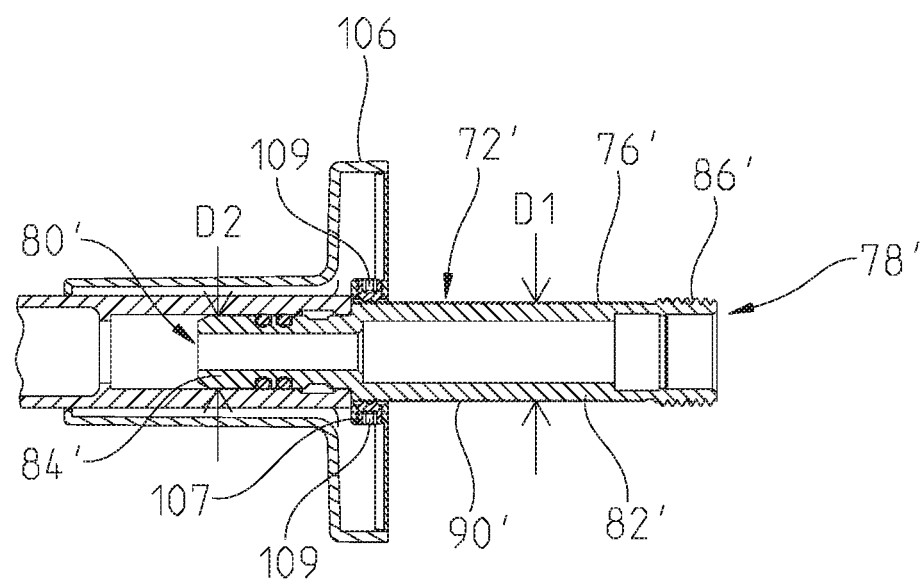
FIG. 8 is a cross-sectional view of the illustrative upper mount, taken along line 8-8 of FIG. 7.
Figure 9:
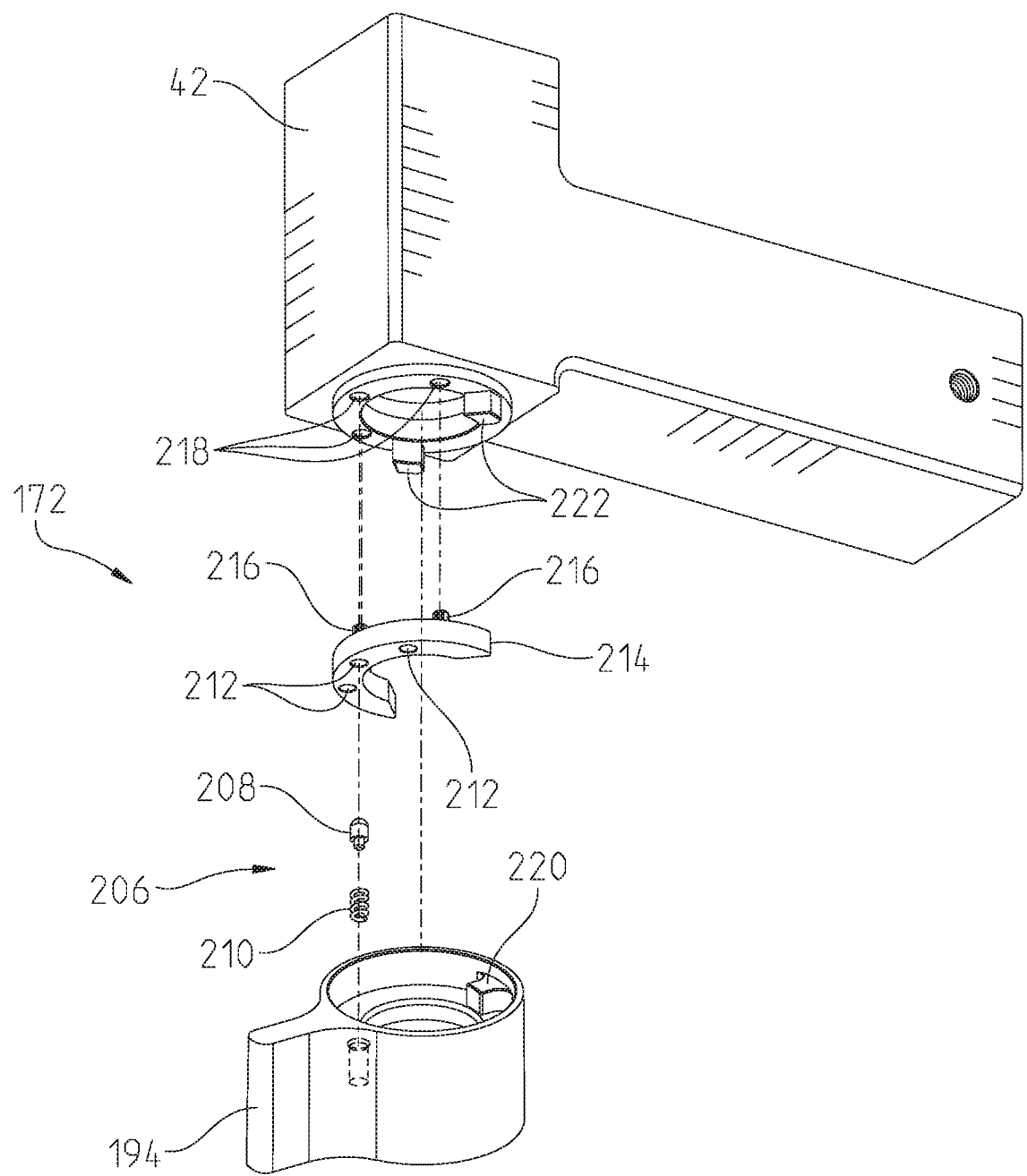
FIG. 9 is an exploded perspective view of a user interface of the illustrative actuator of FIG. 6.

With reference to FIGS. 7 and 8, a further illustrative embodiment upper mount 12' includes a supply tube 72' having a cylindrical side wall 76' extending between opposing proximal and distal ends 78' and 80'. The side wall 76' includes a first or proximal portion 82', and a second or distal portion 84'. Illustratively, the proximal portion 82' of the side wall 76' has a first outer diameter D1, and the distal portion 84' of the side wall 76 has a second outer diameter D2 less than the first outer diameter D1. External threads 86' are illustratively supported by the proximal portion 82' of the side wall 76' and engage internal threads 88 of the shower pipe 38. A plurality of ribs 90' are illustratively supported by the proximal portion 82' of the side wall 76' distally of the external threads 86'.

A mounting plate or flange 92' is illustratively coupled to the supply tube 72'. As with the mounting flange 92', the axial position of the mounting flange 92' may be adjusted relative to the proximal and distal ends 78' and 80' of the supply tube 72'. A pair of diametrically opposed slots 98' are configured to receive the mounting bolts 100. As detailed above, toggle nuts 102 mate with the bolts 100 to secure the mounting flange 92' to the shower wall 32. The mounting flange 92' includes an annular shoulder or collar 107 configured to receive a pair of diametrically opposed set screws 109. The set screws 109 engage with the ribs 90' of the supply tube 72' to secure the mounting flange 92' to the supply tube 72'.

With reference to FIGS. 2 and 3, the lower mount 14 illustratively includes a mounting member 110 including a base or flange 112 and a mounting post 114 extending outwardly from the flange 112. Mounting bolts 116 extend through slots 117 in the flange 112, and threadably engage toggle nuts 118 passing through an opening 119 in the shower wall 32 to secure the flange 112 to the outer surface 36 of the shower wall 32. The intermediate arm 56 of the lower connector 42 receives the mounting post 114. Illustratively, the mounting post 114 includes a plurality of barbs 120 configured to engage with set screws 121 to secure the intermediate arm 56 of the lower connector 42 to the lower mount 14.

A cover or escutcheon 122 is illustratively supported by the intermediate arm 56 of the lower connector 42, and engages the outer surface 36 of the shower wall 32. A plurality of ribs 124 are illustratively supported by the cover 122 to frictionally engage and secure the cover 122 to the lower connector 42.

With further reference to FIGS. 1 and 2, an upright tube 126 and a cantilevered arm or tube 128 fluidly couple the showerhead 30 to the diverter valve assembly 26. More particularly, an upright tube 126 is fluidly coupled to the upper arm 46 of the upper connector 40. Illustratively, a set screw 130 is received within an annular groove 132 of the upright tube 126 to secure the upright tube 126 to the upper connector 40. Other connection means, such as threads, may be used to secure the upright tube 126 to the upper connector 40. O-rings 131 may provide a seal between the upright tube 126 and the upper connector 40. The cantilevered tube 128 is illustratively coupled to the upright tube 126 and to the showerhead 30. A set screw 133 within an annular groove 134 of the cantilevered tube 126 illustratively secures the cantilevered tube 128 to the upright tube 126. Other connection means, such as threads, may be used to secure the cantilevered tube 128 to the upright tube 126. O-rings 135 may provide a seal between the cantilevered tube 128 and the upright tube 126.

Figure 5:
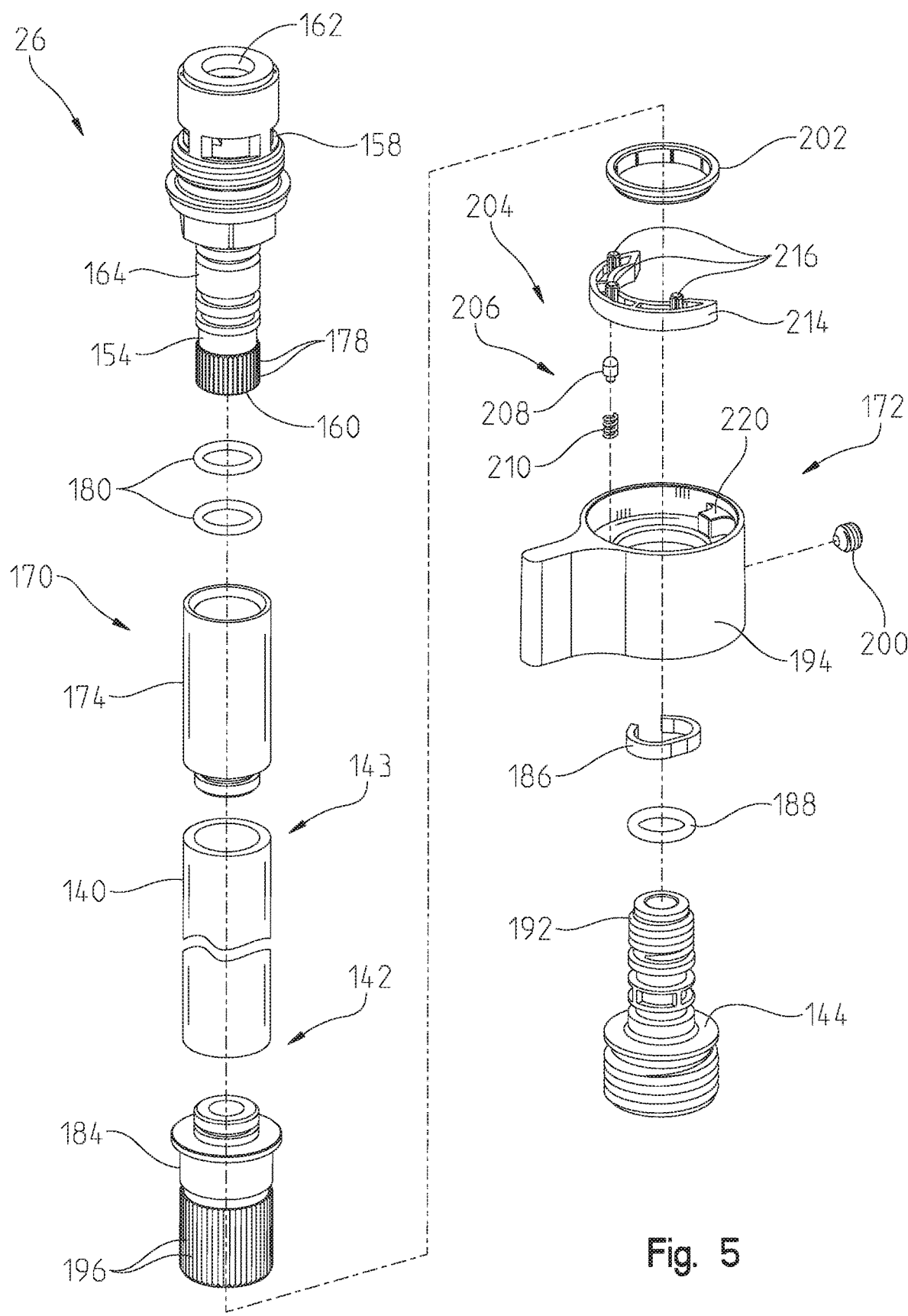
FIG. 5 is an exploded perspective view of the diverter valve assembly and the actuator of the illustrative shower bar system of FIG. 1.
Figure 6:
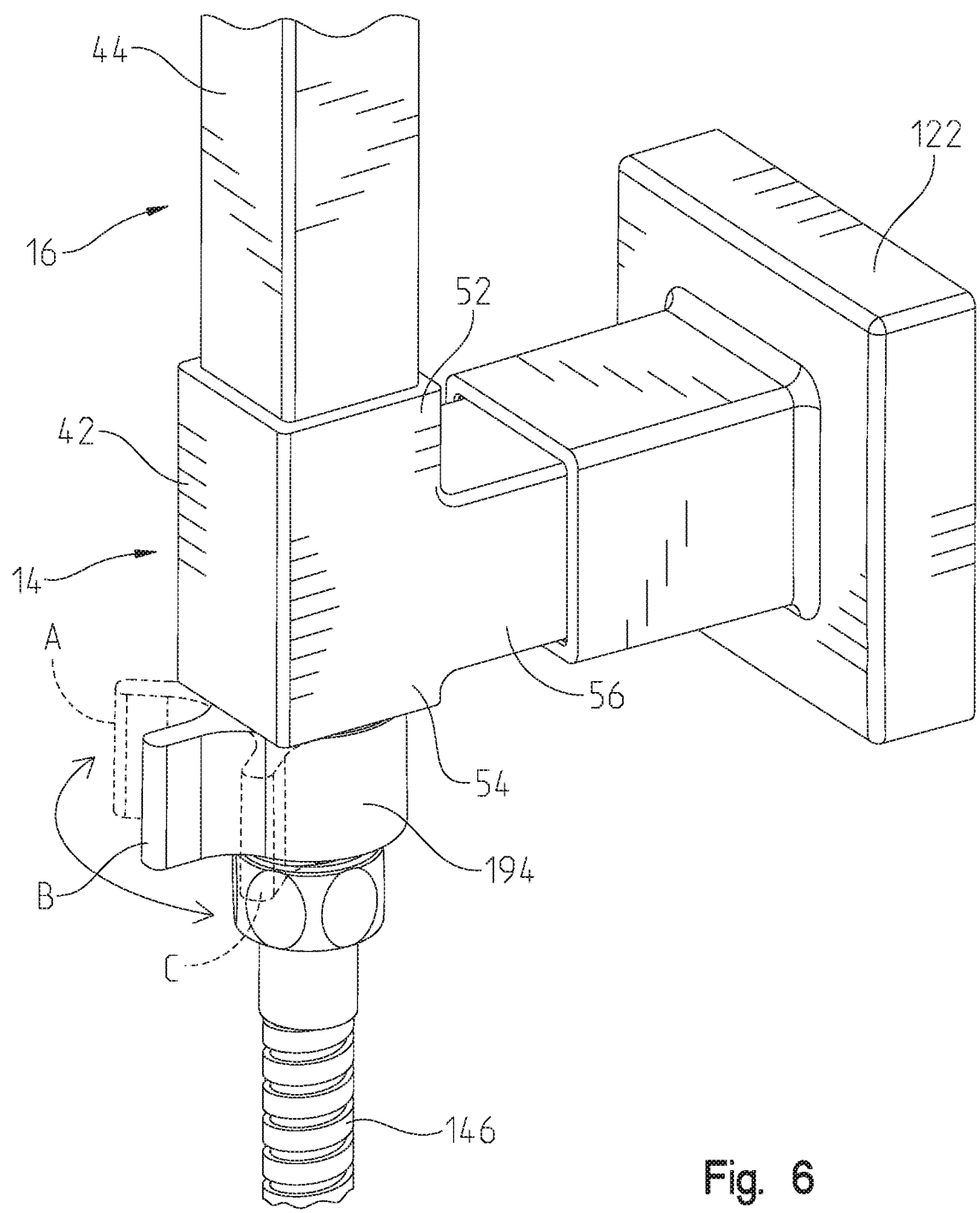
FIG. 6 is a detailed perspective view of a lower mount and a user interface of the illustrative shower bar system of FIG. 1, with different rotational positions of the user interface shown in phantom.

In the illustrative embodiment shown in FIGS. 2, 3 and 5, an axially extending connecting member or tube 140 extends between a lower end 142 and an upper end 143, and is fluidly coupled to diverter valve assembly 26. A lower end 142 of the connecting tube 140 is coupled to a fluid coupling or fitting 144. A flexible hose 146 may fluidly couple the fitting 144 to the handshower 28 (FIG. 1). The handshower 28 is removably coupled to a cradle 148. The cradle 148 may be vertically adjusted along the connecting column member 44.

Figure 10C:
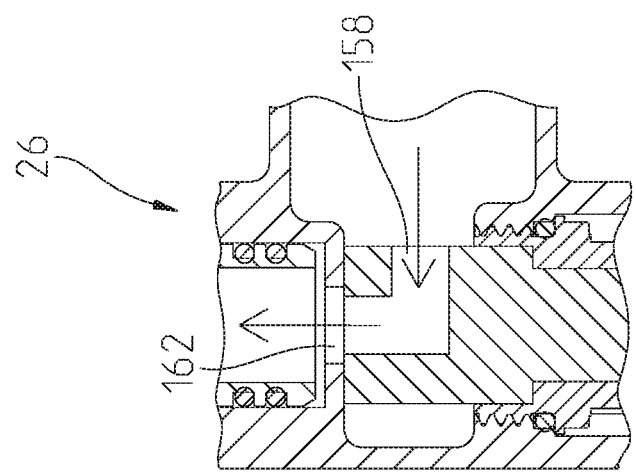
FIG. 10A-10C are diagrammatic views of different positions of the illustrative diverter valve assembly of FIG. 6.
Figure 10B:
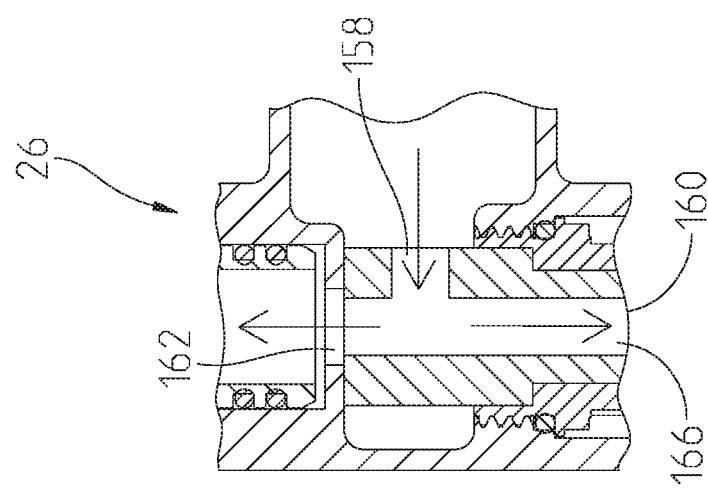
Figure 10A:
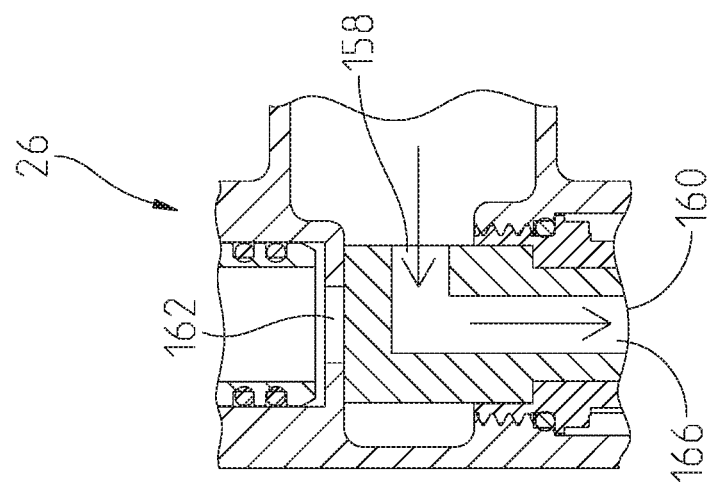

The illustrative diverter valve assembly 26 is supported axially (i.e., vertically) adjacent to the upper mount 12. The diverter valve assembly 26 includes at least three positions to divert water from the inlet 18. In the first position of FIG. 10A, the diverter valve assembly 26 diverts water from the inlet 18 to only the first outlet 22, and thereby to only the handshower 28. In the second position of FIG. 10B, the diverter valve assembly 26 diverts water from the inlet to both the first outlet 22 and the second outlet 24, and thereby to both the handshower 28 and the showerhead 30. In the third position of FIG. 10C, the diverter valve assembly 26 diverts water from the inlet 18 to only the second outlet 24, and thereby to only the showerhead 30.

With further reference to FIGS. 2 and 5, the diverter valve assembly 26 may be of convention design as including at least one moveable valve member or plate 150 coupled to a rotatable valve stem 154. In the illustrative embodiment, the diverter valve assembly 26 includes moveable valve plate 150 (FIG. 2) operably coupled to a valve stem 154 and cooperating with fixed or stationary valve members or plates 156a and 156b to divert water in the manner further detailed herein. A seal is defined between the valve plates 156a and 156b and the upper connector 40. The diverter valve assembly 26 illustratively includes an inlet 158, a first outlet 160, and a second outlet 162. The valve stem 154 is illustratively hollow and, more particularly, includes a cylindrical outer wall 164 defining a fluid passageway 166 and the first outlet 160. The diverter valve assembly 26 may be a conventional three-way diverter valve with a thru-stem port, such as Part Number QI-004 available from Kaiping Hansen Sanitary Co. Ltd. of Guangdong, China.

An actuator 170 is operably coupled to the valve stem 154 of the diverter valve assembly 26. The actuator 170 is configured to transmit rotation from a user interface 172 to the valve stem 154. The axially extending connecting tube 140 includes upper end 143 operably coupled to the valve stem 154, and lower end 142 operably coupled to the user interface 172.

An upper adapter tube 174 illustratively couples the upper end of the connecting tube 140 with the valve stem 154. The upper adapter tube 174 may be secured to the connecting tube 140 via conventional fastening means, such as brazing. Internal splines 176 of the upper adapter tube 174 cooperate with external splines 178 of the valve stem 154 to rotationally retain the connecting tube 140 to the valve stem 154. O-rings 180 illustratively provide a seal between the upper adapter tube 174 and the valve stem 154.

A lower adapter tube 184 illustratively couples the lower end 142 of the connecting tube 140 with the user interface 172. The adapter tube 184 may be secured to the lower end of the connecting tube 140 via conventional fastening means, such as brazing. The adapter tube 184 is illustratively retained to the fitting 144 through a retaining clip 186. An o-ring 188 may provide a seal between the adapter tube 184 and the fitting 144. Cooperating threads 190 and 192 may also retain the adapter tube 184 and the fitting 144.

The illustrative user interface 172 comprises a handle or knob 194, configured to rotate the axially extending connecting tube 140. More particularly, the handle 194 is illustratively coupled to the lower end of the connecting tube 140 and rotatable about the longitudinal axis 45 of the connecting tube 140. Illustratively, the connecting tube 140 fluidly couples the second outlet 162 of the diverter valve assembly 26 with the fitting 144, and thereby with the hose 146 and the handshower 28. Cooperating splines 196 and 198 may rotationally retain the lower adapter tube 184 and the handle 194. A set screw 200 may axially retain the lower adapter tube 184 and the handle 194. A glide ring 202 is illustratively positioned intermediate the adapter tube 184 and the lower connector 42.

With reference to FIGS. 5, 6 and 9-10C, the handle 194 may rotate between three discrete positions associated with the three positions of the diverter valve assembly 26. More particularly, position A of the handle 194 is associated with the first position of the diverter valve assembly 26 shown in FIG. 10A, position B of the handle 194 is associated with the second position of the diverter valve assembly 26 shown in FIG. 10B, and position C of the handle 194 is associated with the third position of the diverter valve assembly 26 shown in FIG. 10C. The actuator 170 illustratively includes an indexing device 204 to releasably secure the handle 194 in one of the three positions A, B and C. The indexing device 204 illustratively includes a detent 206 including a peg 208 and a spring 210 biasing the peg 208 toward circumferentially spaced openings 212 supported within an arcuate member 214. Posts 216 of the arcuate member 214 are illustratively supported within openings 218 formed within a lower surface of the lower connector 42. A stop 220 in the handle 194 is configured to engage cooperating members 222 of the lower connector 42 to provide rotational limits of the handle 194.

Figure 11:
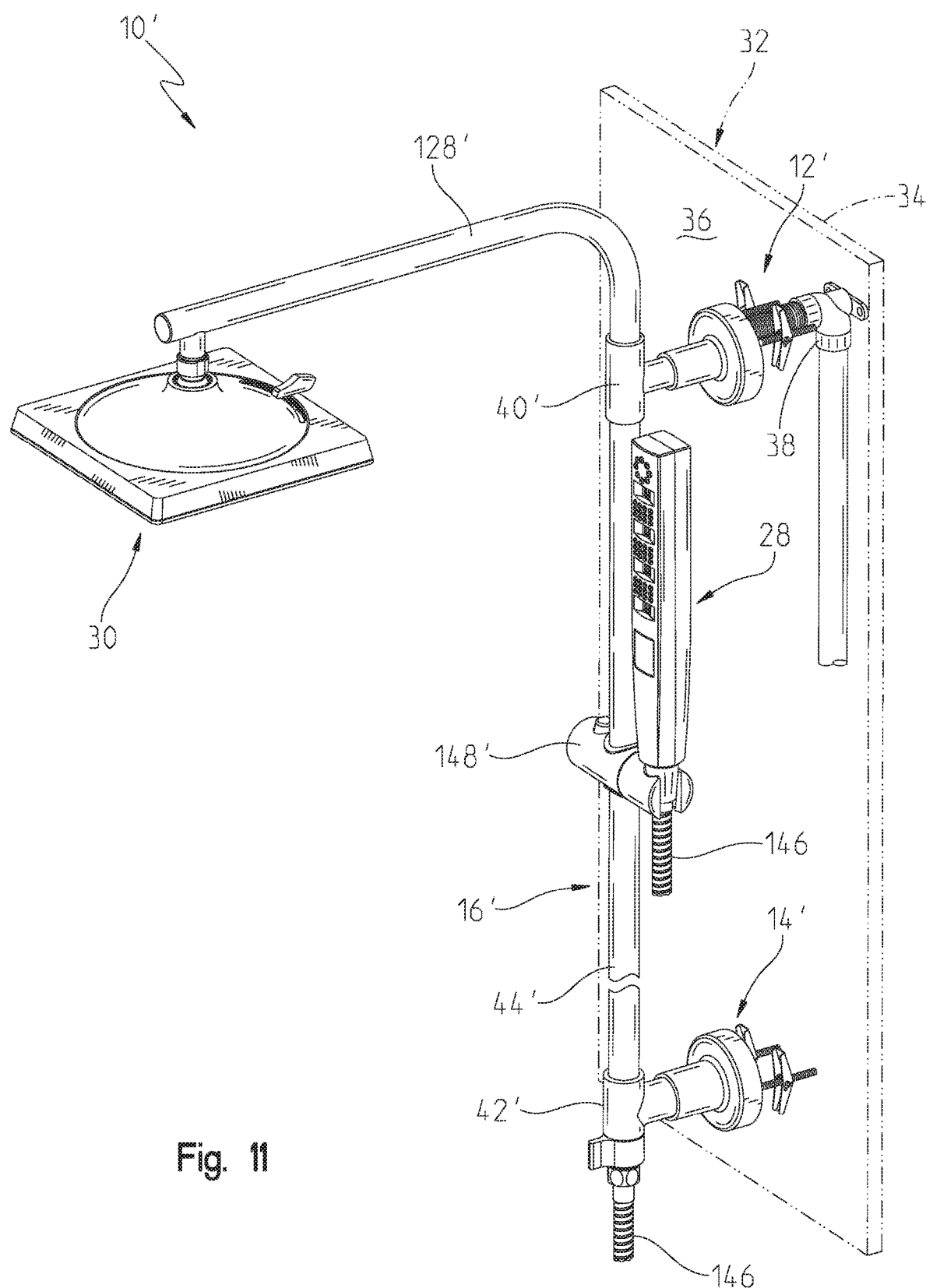
FIG. 11 is a perspective view of another illustrative shower bar system of the present disclosure.

Another illustrative shower bar system 10' is shown in FIG. 11, which includes many of the same components as the shower bar system 10 detailed above in connection with FIGS. 1-10. As such, similar components are identified with like reference numbers. The shower bar system 10' includes certain round or cylindrical components as opposed to rectangular components of the shower bar system 10. For example, the shower column 16, the upper mount 12 and the lower mount 14 of the illustrative shower bar system 10 have substantially rectangular cross-sections. In contrast, the shower column 16', the upper mount 12' and the lower mount 14' of the illustrative shower bar system 10' have substantially round (e.g., circular) cross-sections.

Although the invention has been described in detail with reference to certain preferred embodiments, variations and modifications exist within the spirit and scope of the invention as described and defined in the following claims.

The invention claimed is:

1. A shower system comprising:
   an upper mount including a supply tube having an inlet configured to fluidly couple to a shower pipe supported within a shower wall;
   a shower column operably coupled to the upper mount, the shower column including a connecting pipe in selective fluid communication with the supply tube and having a first outlet;
   a diverter valve assembly fluidly coupled between the supply tube and the connecting pipe, the diverter valve assembly including a movable valve member configured to control water flow from the inlet to the first outlet; and
   an actuator operably coupled to the connecting pipe, wherein rotation of the actuator rotates the connecting pipe and the movable valve member of the diverter valve assembly.

2. The shower system of claim 1, further comprising a lower mount supported by the shower wall and operably coupled to the shower column below the upper mount.

3. The shower system of claim 2, wherein the lower mount is axially adjustable along the shower column.

4. The shower system of claim 1, wherein the upper mount includes a second outlet, the movable valve member of the diverter valve assembly including at least three positions, wherein the movable valve member in a first position diverts water from the inlet to the first outlet and seals water from the inlet to the second outlet, the movable valve member in a second position diverts water from the inlet both the first outlet and the second outlet, and the movable valve member in a third position diverts water from the inlet to the second outlet and seals water from the inlet to the first outlet.

5. The shower system of claim 4, wherein the first outlet is fluidly coupled to a hand shower, and the second outlet is fluidly coupled to a showerhead.

6. The shower system of claim 5, further comprising a cradle supported by the shower column and configured to releasably support the hand shower.

7. The shower system of claim 1, wherein the diverter valve assembly is positioned above the actuator.

8. The shower system of claim 7, wherein the diverter valve assembly is positioned vertically adjacent the upper mount.

9. The shower system of claim 7, wherein actuator includes a user interface coupled to a lower end of the connecting pipe.

10. The shower system of claim 9, wherein the user interface comprises a handle supported for rotation about a longitudinal axis of the shower column.

11. The shower system of claim 1, wherein the upper mount is configured to adjust an upper end of the support column relative to an outer surface of the shower wall.

12. The shower system of claim 11, wherein the upper mount includes a flange is axially adjustable along the length of the supply tube to adjust the horizontal position of the upper end of the support column relative to the outer surface of the shower wall.

13. The shower system of claim 12, wherein the flange is threadably coupled to the supply tube.

14. A shower system comprising:
   an inlet, a first outlet and a second outlet;
   an axially extending shower column in fluid communication with the inlet, the first outlet, and the second outlet;
   a diverter valve assembly including a movable valve member configured to selectively divert water from the inlet to at least one of the first outlet and the second outlet; and
   an actuator including a user interface positioned below the diverter valve assembly, and an axially extending connecting member operably coupling the movable valve member and the user interface.

15. The shower system of claim 14, wherein the connecting member comprises a connecting pipe fluidly coupling the diverter valve assembly to the first outlet.

16. The shower system of claim 14, further comprising:

an upper mount including a supply tube having an inlet configured to fluidly couple to a shower pipe supported within a shower wall;

a lower mount supported by the shower wall and operably coupled to the shower column below the upper mount; and a shower column coupled to the upper mount and the lower mount.

17. The shower system of claim 16, wherein the lower mount is axially adjustable along the shower column.

18. The shower system of claim 16, wherein the diverter valve assembly is positioned vertically adjacent the upper mount.

19. The shower system of claim 18, wherein the first outlet is fluidly coupled to a hand shower, and the second outlet is fluidly coupled to a showerhead.

20. The shower system of claim 19, further comprising a cradle supported by the shower column and configured to releasably support the hand shower.

21. The shower system of claim 19, wherein the user interface comprises a handle supported for rotation about a longitudinal axis of the shower column.

22. The shower system of claim 16, wherein the upper mount is configured to adjust an upper end of the support column relative to an outer surface of the shower wall.

23. The shower system of claim 22, wherein the upper mount includes a flange axially adjustable along the length of the supply tube to adjust the horizontal position of the upper end of the support column relative to the outer surface of the shower wall.

24. The shower system of claim 23, wherein the flange is threadably coupled to the supply tube.

25. A shower system comprising:

an upper mount including a supply tube having an inlet configured to fluidly couple to a shower pipe supported within a shower wall;

a shower column operably coupled to the upper mount, the shower column including a connecting pipe in selective fluid communication with the supply tube and having a first outlet wherein the upper mount is configured to adjust an upper end of the support column relative to an outer surface of the shower wall;

a lower mount supported by the shower wall and operably coupled to the shower column below the upper mount;

a diverter valve assembly fluidly coupled between the supply tube and the connecting pipe, the diverter valve assembly including a movable valve member configured to control water flow from the inlet to the first outlet;

an actuator operably coupled to the connecting pipe, wherein rotation of the actuator rotates the connecting pipe and the movable valve member of the diverter valve assembly, the actuator including a user interface coupled to a lower end of the connecting pipe, the user interface including a handle supported for rotation about a longitudinal axis of the shower column; and wherein the upper mount includes a second outlet, the movable valve member of the diverter valve assembly including at least three positions, wherein the movable valve member in a first position diverts water from the inlet to the first outlet and seals water from the inlet to the second outlet, the movable valve member in a second position diverts water from the inlet both the first outlet and the second outlet, and the movable valve member in a third position diverts water from the inlet to the second outlet and seals water from the inlet to the first outlet.

* * * * *